March 2, 1971 D. CULP 3,566,415
PRESSURE DISCHARGE WASTE DISPOSAL APPARATUS
Filed Aug. 20, 1969 3 Sheets-Sheet 3
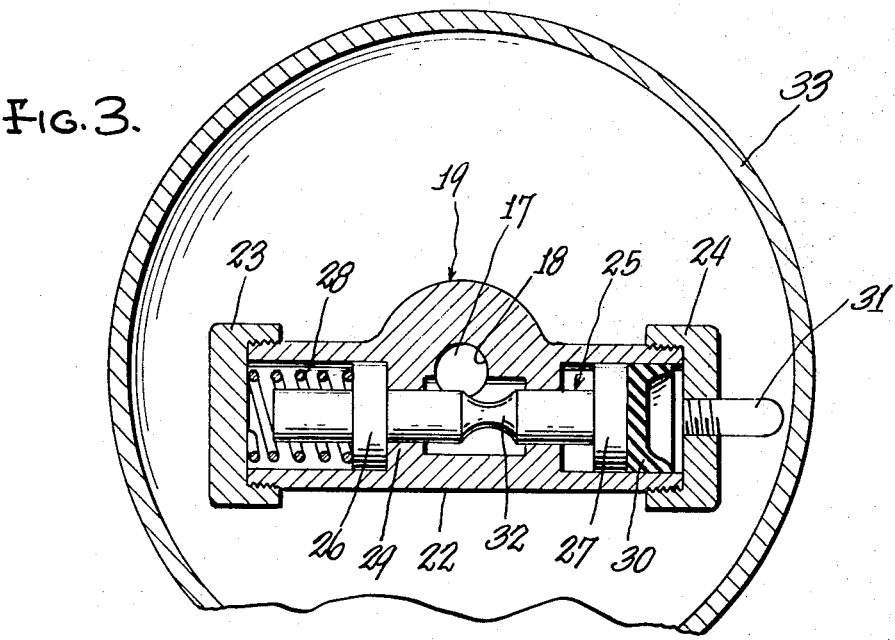
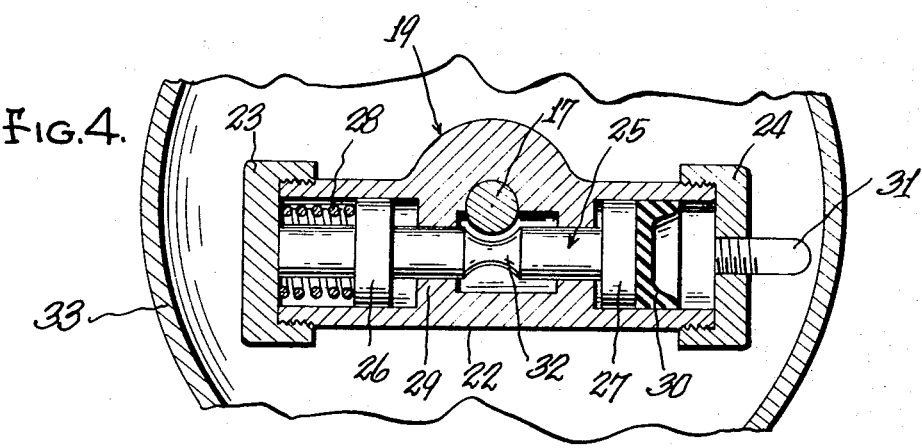
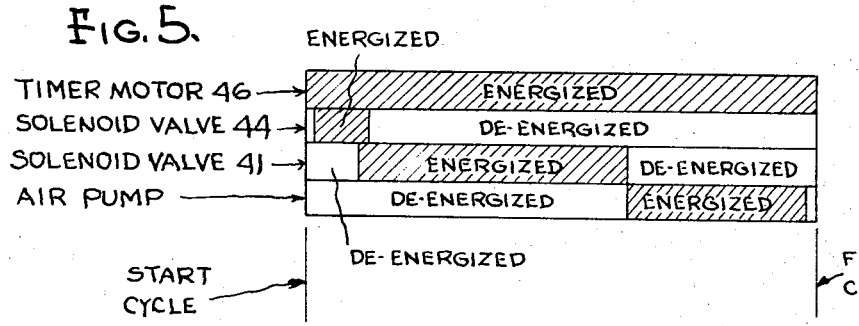
INVENTOR.
DUANE CULP
BY
William and Krski
ATTORNEYS United States Patent Office 3,566,415
Patented Mar. 2, 1971

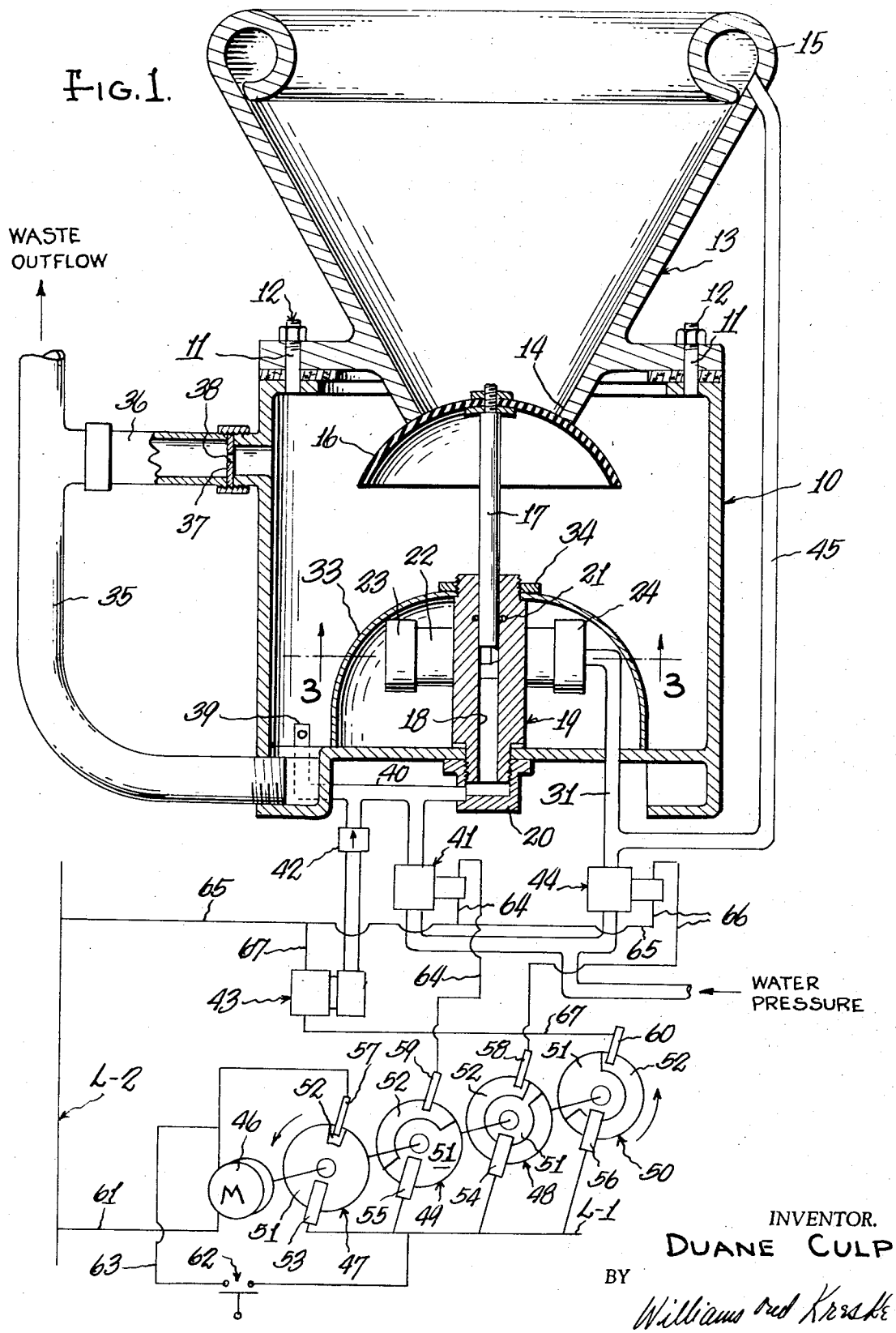

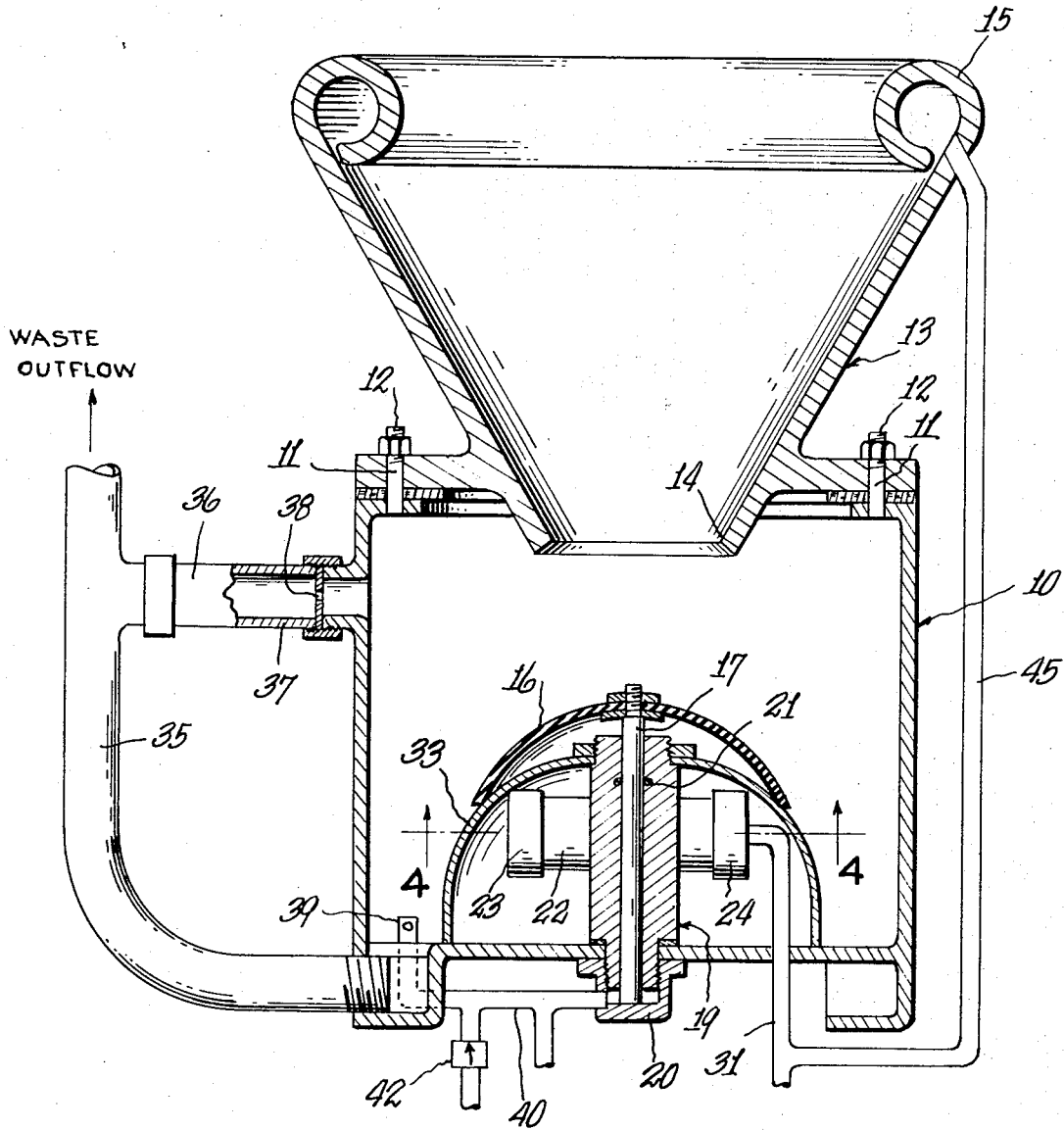

3,566,415
PRESSURE DISCHARGE WASTE DISPOSAL
APPARATUS
Duane Culp, P.O. Box 345, North Lima, Ohio 44452
Filed Aug. 20, 1969, Ser. No. 851,581
Int. Cl. E03d *1/36, 1/30, 3/10*
U.S. Cl. 4—10
12 Claims

ABSTRACT OF THE DISCLOSURE

A pressure discharge waste disposal device, such as a toilet, for use where waste must be discharged upwardly against the force of gravity or against a head of pressure resulting for any other reason. Said device comprises a chamber for receiving waste, a valve in the chamber shiftable to one position to permit gravitation of waste and flow of water into the chamber, and shiftable to another position so that air under pressure may be introduced to forceably discharge the waste and water from the chamber through a waste conduit.

BACKGROUND AND SUMMARY

In many homes, especially those in suburban areas having individual septic tank sewage disposal systems, the sewage lines are relatively close to ground level, in many cases being well above the basement floor. A conventional toilet, therefore, cannot be installed in the basement since such toilets must be above the sewage line into which they discharge.

Heretofore, pressure discharge toilets have been devised which can discharge to an overlying sewage line or against a head of pressure existing for other reasons. Unfortunately, however, such prior art devices have been so expensive that their use has been severely limited.

In contrast, the present invention provides a device so efficient, trouble free and relatively low in cost that a wide market potential exists. Indeed, the present device will be an attractive alternative to installation of conventional toilets in the basements of existing homes, where this is possible, since the present invention makes it unnecessary to break up the basement floor and to excavate down to the buried sewage line.

These and other advantages will readily become apparent from a study of the following specification and from the appended drawings, and in these drawings:

DRAWING DESCRIPTION

FIG. 1 is a view in vertical section of a device embodying the present invention, certain control circuitry and fluid conduits being shown diagrammatically, FIG. 2 is a fragmentary view, similar to FIG. 1, but with certain parts seen in another stage of operation, FIG. 3 is an enlarged, fragmentary sectional view generally corresponding to the line 3—3 of FIG. 1, FIG. 4 is a view similar to FIG. 3 but with certain parts seen in another position, and FIG. 5 is a graph illustrating an operational sequence of the present invention.

DETAILED DESCRIPTION

With reference to FIG. 1, there is shown a pressure discharge toilet structure embodying the present invention and having a hollow base 10 whose interior provides a chamber for a purpose to appear. Seated upon and suitably gasketed to the upper, open top base 10, and secured thereto by means of studs 11 and nuts 12 is a receptacle or bowl 13. The downwardly and inwardly sloping walls of the receptacle 13 terminate in an opening 14 within the base 10 and the upper, open rim of the receptacle is margined by a hollow rim 15.

Normally closing the receptacle opening 14 from the interior of the base 10 is a generally spheroid valve head 16 formed of a flexible yet tough material. Valve head 16 may, for example, be formed of rubber reinforced with a tough fabric or the like. In any event and as clearly illustrated, valve head 16 is of a size larger than the receptacle opening 14 so as to close the latter in the position of parts seen in FIG. 1.

Valve head 16 is suitably anchored to a plunger 17 which is vertically reciprocable in the bore 18 of a housing 19. As illustrated, plunger 17 is preferably concentric with the opening 14 and vertically aligned therewith for a purpose to appear. Plunger housing 19 may be anchored to the floor of the base 10 by means of a cap member 20 having threaded engagement with a housing portion protruding through an aperture in such floor. For purpose of providing a fluid-tight seal between the plunger 17 and the housing bore 18, the housing may carry a conventional resilient sealing ring 21.

Disposed at an intermediate portion of housing 19 and extending transversely thereof is an integral housing portion 22 having threaded end caps 23 and 24. Slidably disposed within housing portion 22 (see FIG. 3) is an elongated latch member 25 having radially enlarged heads 26 and 27. Interposed between the latch member head 26 and the cap 23 is a spring 28 which yieldably retains the latch member in the position illustrated wherein head 26 abuts a wall 29 of the housing portion.

Seated against latch member head 27 is a flexible cup member 30 having sealing engagement with the bore of the housing portion. The cup member 30 and the head 27 form a piston to effect movement of latch member 25 to the left, thus compressing the spring 28, as seen in FIG. 4, when fluid pressure is admitted to the right of the cup member through a conduit 31 connection to the cap 24. Latch member 25 has a reduced-diameter, intermediate portion 32 which, in the position of parts seen in FIG. 4, is in registry with the plunger 17 so as not to impede free vertical movement thereof. When, however, the latch member 25 is in the position seen in FIG. 3, its reduced diameter portion 32 is out of registry with the plunger 17 and thus an adjoining latch member portion underlies the lower end of the plunger to retain it in the uppermost position seen in FIG. 1.

Extending from the upper portion of the plunger housing 19 to the floor of the base 10 is a shield 33 retained in position by a collar 34 threaded on the upper portion of the plunger housing. As illustrated, shield 33 encloses the housing 19, its portion 22 with the caps 23, 24 and the conduit 31.

Still referring to FIG. 1, a waste outlet conduit 35 communicates with the interior of the base adjacent its floor and at the outer periphery of the base. Conduit 35 extends upwardly, in the present embodiment, for connection to a sewer line (not shown). Extending between a portion of conduit 35 spaced from the base 10 and an upper portion of the base 10 is a conduit 36 in which is replaceably disposed a rupture disk 37. Disk 37 will remain intact during normal operation of the apparatus as will later be described; however, the strength of the disk will be such that if excessive pressure should develop within the base 10, caused perhaps by an obstruction at the entrance to conduit 35, the disk will rupture thereby venting pressure within the base to the conduit 35 and thence to the connected sewer line. For a reason to appear, a small aperture 38 is formed in the disk to bleed pressure within the base to the conduit 35 and thence to the sewer line.

Disposed within the base 10 is a fluid discharge nozzle 39 arranged to discharge fluid tangentially of the base so as to impart a swirling motion thereto. Additionally, nozzle 39 is preferably disposed to direct fluid discharged therefrom across the entrance to the waste outlet conduit 35 for a purpose to appear. While only one nozzle 39 has herein been shown, it will be appreciated that several could be employed, preferably disposed within the base in circumferentially spaced relation.

Extending between the nozzle 39 and the cap 20 is a conduit 40 which establishes communication of each with a source of water under pressure through a normally closed, solenoid valve 41 of conventional design. Also communicating with the nozzle 39 and the cap 20 through a check valve 42 is an electrically driven air pump 43. The previously mentioned conduit 31 leading to the housing portion cap 24, is also connected to the source of water pressure through another normally closed, conventional solenoid valve 44. A branch conduit 45 leads from the conduit 31, to the previously mentioned, receptacle hollow rim 15.

The means provided for actuating the solenoid valve 41, 44 and the air pump 43 in the required timed sequence is presently shown to comprise an electrically driven timer motor 46 adapted to simultaneously rotate contact disks 47, 48, 49 and 50 in the direction indicated by the arrows. Each disk has an electrically conductive portion 51 interrupted by insulated portions 52 and respective contacts 53, 54, 55 and 56 are in continuous contact with respective, conductive disk portions 51. Similar contacts 57, 58, 59 and 60 are engaged with respective disks 47 through 50; however, in the position of parts shown, each of such contacts is engaged with respective disk insulated portions 52.

Each of the contacts 53 through 56 is connected to an electrical power line L–1 while the contacts 57 through 60 are connected to a power line L–2 through circuits next to be described.

Contact 57 is connected to power line L–2 via a circuit 61 which includes the timer motor 46. A momentary contact push button 62 is in a circuit 63 which extends between line L–1 and circuit 61 at a portion of the latter intermediate the timer motor and the contact 57.

Contact 59 is connected to line L–2 via circuits 64, 65, the former of which includes the solenoid actuator of the valve 41 and contact 58 is connected to the line L–2 via circuits 66, 65, the former of which include the solenoid actuator of the valve 44. Finally, contact 60 is connected to line L–2 via vircuits 67 and 65, the former of which includes the motor of the air pump 43.

OPERATION

With the parts positioned as seen in FIGS. 1 and 3, operation will be as follows, it being especially noted that the latch member 25 (see also FIG. 3) is engaged beneath the plunger 17 to thus retain the attached valve head 16 in its upper position wherein it tightly closes the opening 14 between the receptacle or bowl 13 and the interior of the base 10.

Button 62 will first be pressed to energize timer motor 46 through circuits 61, 63. The timer motor will rotate the contact disks 47 through 60 in the direction of the arrows and when the insulated portion 52 of contact disk 47 has moved from beneath the contact 57, a circuit will be completed across lines L–1, L–2 through the contact 53, conductive portion 51 of disk 47, contact 57, and circuit 61. Button 62 may now be released since contact disk 47 and contacts 53, 57 will maintain energization of the timer motor 46 until a complete cycle of operation is completed as will be described and as seen from the operational sequence chart seen in FIG. 5.

Immediately after energization of timer motor 46 and after slight rotation of the contact disks, the conductive portion 51 of disk 48 will have moved to engagement with the contact 58 thus energizing solenoid valve 44 through the circuits 66, 65. With energization of valve 44, water under pressure will be fed to bowl rim 15 through the conduit 45 and to the right end of cup member 30 (see FIG. 3) through conduit 31. Water discharged into rim 15 will flow down the bowl interior wall, preferably with a swirling motion, to clean such wall. At the same time, admission of water pressure to the right of cup member 30 will shift the latch member 25 to the left, against the spring 28, to the position of FIG. 4 wherein the latch member portion 32 is in registry with the valve plunger 17.

With the latch member positioned as seen in FIG. 4, the weight of valve head 16 and the plunger 17 will cause immediate gravitation of such valve head and plunger to the position seen in FIG. 2 thus dropping all of the contents of the bowl 13 into the interior of the base. Continued flow of water for a short time to the rim 15 will cause such water to cascade down upon the valve head 16, directly beneath the opening 14, of course, thus effectively flushing any waste material from the valve head.

A short period of time (say 5 seconds) after energization of solenoid valve 44 as hereinabove described, and as represented in FIG. 5, contact disk 49 will have rotated sufficiently to cause energization of solenoid valve 41 through contact 55, disk conductive portion 51, contact 59, and circuits 64, 65. Upon energization of solenoid valve 41, water under pressure will flow through the conduit 40 to the interior of cap 20 and to the nozzle 39. With water under pressure at the cap 20, plunger 17 will immediately be shifted from the position see in FIG. 2 to the position of FIG. 1 once again thus causing the valve head 16 to close the opening 14 between the bowl 13 and the interior of the base 10. Flow of water to the nozzle 39 will initiate filling of the base interior, it being understood that since the nozzle is directed tangentially of the base, a swirling motion is imparted to the contents therewithin which tends to break up any solid matter. Moreover, since the nozzle is directed across the entrance to the waste conduit 35, the lodging of any solid matter thereat will be prevented.

After slight further rotation of the timer motor, disk 48 will have rotated sufficiently to once again position the insulated disk portion 52 beneath the contact 58 thus de-energizing the solenoid valve 44. This will interrupt flow of water through the conduits 45 and 31 to terminate flushing of the bowl 13 and to allow the spring 28 to shift the latch member 25 from the position of FIG. 4 to the position of FIG. 3 wherein it is once again engaged beneath the plunger 17.

Flow of water through the nozzle 39 via the energized valve 41 will continue for some time (say 30 seconds) as illustrated in FIG. 5, until disk 49 has been rotated sufficiently that its insulated portion 52 once again engages the contact 59 thereby de-energizing the valve 41. At substantially the same time (see FIG. 5), disk 50 will have rotated sufficiently that its conductive portion 51 will engage the contact 60 thereby energizing the air pump 43 through the contact 56, portion 51 of disk 50, contact 60, and circuits 67, 65.

Upon energization of pump 43, air under pressure will be discharged through the nozzle 39 thus continuing to swirl and agitate the waste material and water within the base. The continued discharge of air through the nozzle 39 will build up pressure within the base, it being understood that air flow through the aperture 38 in rupture disk 37 is too slight to materially reduce the rise in pressure caused by operation of pump 43. It will also be understood that as pressure increases within the base 10, the valve head 16 will be even more tightly seated in place closing the opening 14.

When air pressure within the interior of the base 10 exceeds the pressure head within the conduit 35, the waste matter within the base will be forced out of the base and into such conduit for ultimate discharge into the sewage line (not shown). Air under pressure will continue to be delivered by the pump 43 until disk 50 has been rotated sufficiently (about 29 seconds) that its insulated portion 52 once again engages with the contact 60 to deenergize the pump 43. Immediately after rotation aforesaid of the disk 50, disk 47 will have been rotated sufficiently that the insulated portion 52 thereof will engage contact 57 thereby de-energizing timer motor 46 to once again restore the parts to the position seen in FIG. 1.

Following de-energization of the pump 43, the air pressure within the base 10 will bleed off into the conduit 35 through the opening 38 in the rupture disk 37 to thus equalize the pressure between the interior of the base and the bowl 13. Until such pressure is equalized, it will be understood that valve 16 will be retained in its position seen in FIG. 1 by the pressure within the base. Further, and while not shown, a pressure responsive switch could be interposed in the circuit 63 which includes the start switch 62 to prevent initiation of a cycle of operation of the device until such time as the pressure within the base has been equalized as hereinabove pointed out.

I claim:

1. A pressure discharge waste disposal device for use where waste must be discharged upwardly against the force of gravity or against a head of pressure, said device providing a receptacle, a chamber beneath said receptacle for receiving waste from the latter through a communicating opening therebetween, and a waste conduit in communication with a lower portion of said chamber, the improvement comprising
   a valve member within said chamber and shiftable between an upper position wherein said opening is closed thereby and a lower position wherein said opening is open, in both of said positions, said valve member being aligned with said opening,
   means for effecting valve member movement from its upper closed position to its lower open position thereby permitting gravitation of the receptacle contents through said opening into said chamber and for effecting flow of water to the interior of said receptacle to flush both the latter and said valve member,
   means for effecting valve member movement from its lower open position to its upper closed position,
   and means for introducing air under pressure into said chamber while said valve member remains in its upper closed position to forceably discharge the chamber contents through said waste conduit.

2. The construction of claim 1 wherein said valve member provides an upwardly directed, generally spheroid face which is larger than said opening for completely closing the latter when said valve member is in its upper position.

3. The construction of claim 1 and further comprising means for equalizing the pressure between the interiors of said chamber and said receptacle after discharge aforesaid of the chamber contents into said waste conduit.

4. The construction of claim 3 wherein said equalizing means comprises a conduit extending from an upper portion of said chamber to a portion of said waste conduit spaced from said chamber.

5. The construction of claim 1 and further comprising a pressure relieving device interposed between an upper portion of said chamber and a portion of said waste conduit spaced from said chamber to relieve excess pressure which could develop within the latter in the event communication of the waste conduit therewith becomes blocked.

6. The construction of claim 5 wherein said pressure relieving device comprises a disk adapted to rupture under excessive pressure and interposed in a conduit extending between an upper portion of said chamber and a portion of said waste conduit spaced from said chamber.

7. The construction of claim 6 wherein said disk is apertured to provide for equalization of pressure between the interior of said chamber and said receptacle after discharge aforesaid of the chamber contents into said waste conduit.

8. The construction of claim 1 and further comprising a fluid motor member for effecting valve member movement from its lower open position to its upper closed position.

9. The construction of claim 8 and further comprising means for effecting flow of water under pressure simultaneously to said fluid motor member and to said chamber for respectively shifting said valve member to its upper closed position and for mixing with the contents of said chamber.

10. The construction of claim 8 and further comprising latch means for releasably retaining said valve member in its upper closed position aforesaid.

11. The construction of claim 10 and further comprising a fluid motor member connected to and effecting movement of said latch means to valve-releasing position.

12. The construction of claim 11 and further comprising resilient means for effecting movement of said latch means to valve-retention position.

References Cited

UNITED STATES PATENTS

| | | | |
|---|---|---|---|
| 2,315,824 | 4/1943 | Sweeny | 4—77 |
| 2,449,442 | 9/1948 | Agra | 4—77 |
| 2,501,510 | 3/1950 | Gross, Jr. | 4—77 |
| 2,768,386 | 10/1956 | Graef et al. | 4—77X |
| 2,886,826 | 5/1959 | Shaleen | 4—10 |
| 3,184,761 | 5/1965 | Broughton | 4—90 |
| 3,214,772 | 11/1965 | Roberts et al. | 4—79 |

LAVERNE D. GEIGER, Primary Examiner

H. K. ARTIS, Assistant Examiner

U.S. Cl. X.R.

4—76, 79